May 21, 1935.  B. A. CUNNINGHAM  2,001,901
ODOR SEALING VALVE FOR COMBINATION SEWER DRAINS
Filed Oct. 14, 1933   2 Sheets-Sheet 1
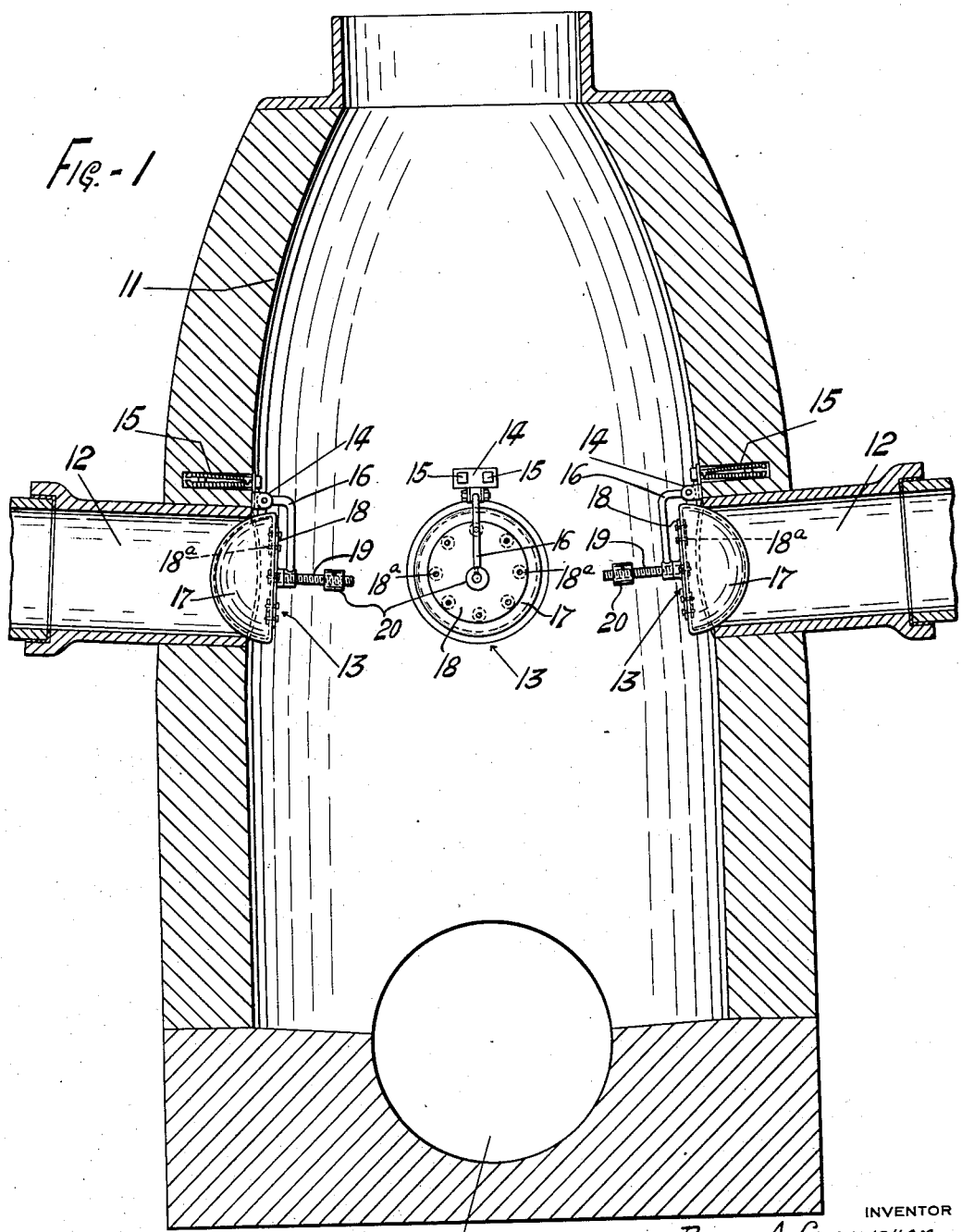
INVENTOR
BRANT A. CUNNINGHAM
BY
ATTORNEYS

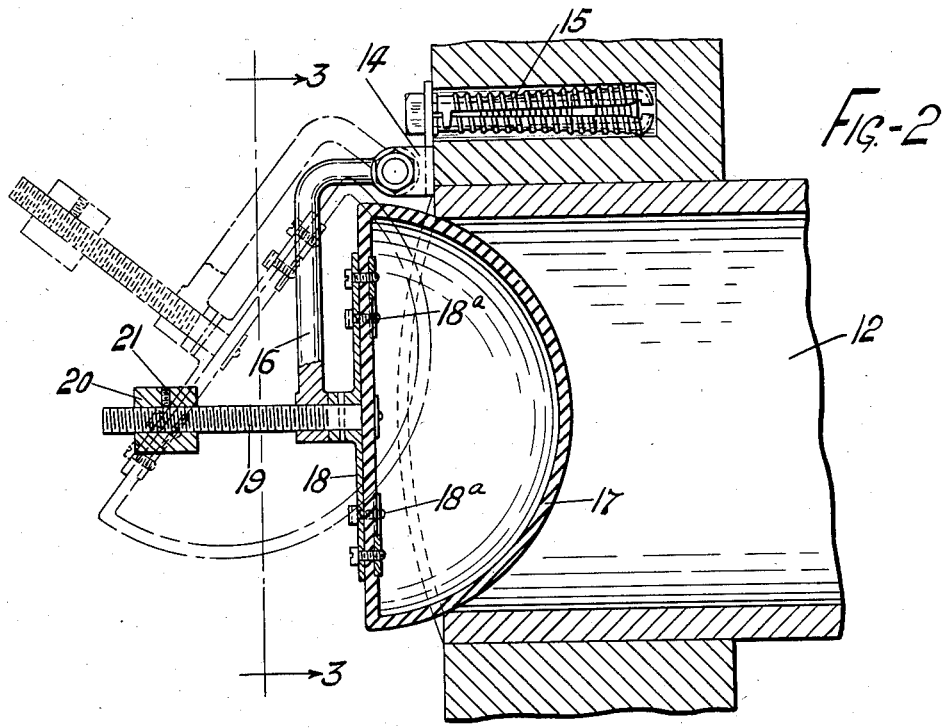
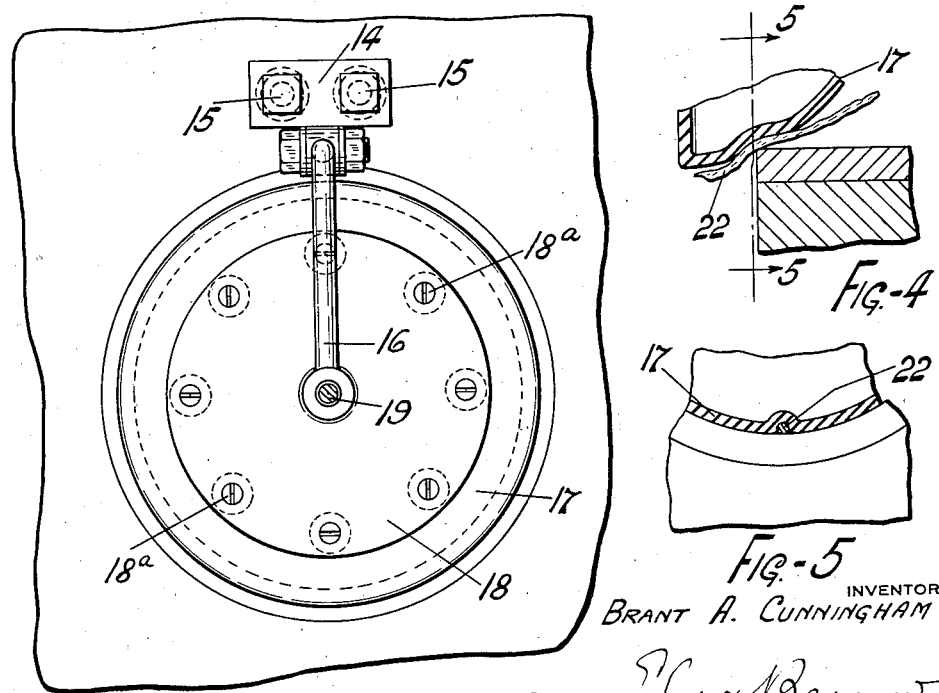

Patented May 21, 1935

2,001,901

UNITED STATES PATENT OFFICE 2,001,901

ODOR-SEALING VALVE FOR COMBINATION SEWER DRAINS

Brant A. Cunningham, Akron, Ohio

Application October 14, 1933, Serial No. 693,627

3 Claims. (Cl. 182—4)

This invention relates to odor-sealing valves for storm-water drains such as are placed along streets and such as lead to combination sewers.

Heretofore, for a great many years much difficulty has been experienced in the use of combination sewers in the prevention of the emanation of foul gases from the storm-water drains leading thereto. A great many installations have been made without taking any precaution against such conditions and where valves for accomplishing this purpose have been provided in the past, they are of expensive construction and are not entirely satisfactory. They cannot be economically and effectively used in sewer drains already constructed and even in new installations are objectionable in that the valve is frequently held in a partly open non-sealing relation by solids such as dirt, leaves, twigs, etc., which occasionally will lodge in the valve.

The general purpose of the present invention is to provide an odor-sealing valve for storm-water drains which is simple and economical in construction, which may be easily installed in sewer systems already constructed and which will be effective in operation even under adverse conditions when solids become lodged in the valve.

The foregoing and other purposes of the invention are attained in the valve illustrated in the accompanying drawings and described below. It is to be understood that the invention is not limited to the particular form thereof shown and described.

Of the accompanying drawings,

Figure 1 is a diametral section through a man-hole on a combination sewer system and showing the storm-water drains leading thereto with the improved valves in place;

Figure 2 is an enlarged view partly in section of the right-hand valve as shown in Figure 1, the other valves shown in Figure 1 being of the same construction;

Figure 3 is an elevation from line 3—3 of Figure 2;

Figure 4 is a fragmentary sectional elevation showing the action of the valve respecting the drain outlet when a twig or the like happens to lodge therein; and Figure 5 is a section on line 5—5 of Figure 4.

Referring to the drawings, the numeral 10 designates a combination sewer on which is a manhole 11 to which lead storm-water drains 12, 12, three of such drains being shown in the illustration.

The improved valves are shown generally at 13 and cooperate with the outlet openings from the drains 12 into the manhole 11. These valves each comprise a bracket 14 which may be easily secured to any concrete or masonry wall employed for the manhole by expansion bolts 15, 15 inserted in sockets drilled into said wall above each drain outlet. Pivoted on each bracket 14 is a valve arm 16 which preferably is of L-shape extending first inwardly from the bracket and then downwardly so that its free end is substantially aligned with the center of the drain outlet.

A valve member 17 is carried by the valve arm 16 and preferably is of waterproof flexible elastic deformable material such as a hollow rubber semi-sphere or a pad of soft cellular or spongy rubber or the like. The valve member 17 may be secured on a backing plate 18 as by screw bolts 18a, 18a so that the semi-spherical face of the valve member will enter and cooperate with the drain outlet. The valve member assembly including the backing plate 18 may be secured on a rod 19 threaded through the free end of arm 16, and a valve-operating weight 20 may be threaded on said rod to any desired adjusted position in which it may be held by a set screw 21 to apply determinate pressure on the valve member 17 to seal it effectively against the drain outlet. The arrangement is such that the valve member 17 is positioned substantially upon a horizontal axis, and the backing plate 18 serves to support the valve structure against sagging, and also serves to transmit the pressure of the weight 20 over a relatively large area with the result that the attaching face of the valve structure is not deformed and said pressure is utilized wholly for urging the convex surface of the valve against its seat on the drain outlet.

As will be apparent from the foregoing the rubber valve member will normally be pressed against the outlet end of the drain conduit 12 by gravity, being somewhat deformed by the pressure so as effectively to seal said outlet. In round manholes such as shown the edge of the drain outlet will be non-planar, but notwithstanding this the rubber valve member will deform as required to seal such an outlet. As shown in Figures 4 and 5, in event solids such as a twig 22 become lodged in the drain outlet, the material of valve member 17 will be deformed about the twig so as substantially to maintain the seal. It will similarly deform about other solids such as dirt, leaves, etc., which may become so lodged. The valve will swing open as shown in Figure 2 to the inward rush of storm-water, it being capable of swinging upwardly sufficiently to provide a substantially unobstructed drain outlet.

By the invention a highly effective odor-sealing valve has been provided for the stated purpose. Obviously modifications of the invention may be resorted to without departing from the spirit thereof or the scope of the appended claims.

What is claimed is:

1. In combination, a sewer system having a manhole therein, a drain conduit leading to said manhole and having an outlet in said manhole, a valve structure of waterproof, flexible, deformable material disposed on a horizontal axis and having a surface thereof shaped to cooperate with and enter said outlet end of the conduit, means disposed co-axially of said valve structure for supporting the same, and means operating through said support for yieldingly retaining said valve under deforming pressure against said outlet end of said conduit.

2. In combination, a sewer system having a manhole therein, a drain conduit opening into said manhole, a valve structure arranged on a horizontal axis having a convex portion of waterproof, flexible, deformable material adapted to enter said conduit opening, a backing structure of rigid material on said valve structure, and means connected to said rigid backing for pendulously supporting said valve structure in position normally to close said drain opening.

3. A combination as defined in claim 2 in which the valve is a hemispherical structure of soft, resilient rubber having a metal backing on its plane face.

BRANT A. CUNNINGHAM.